Patented June 4, 1940

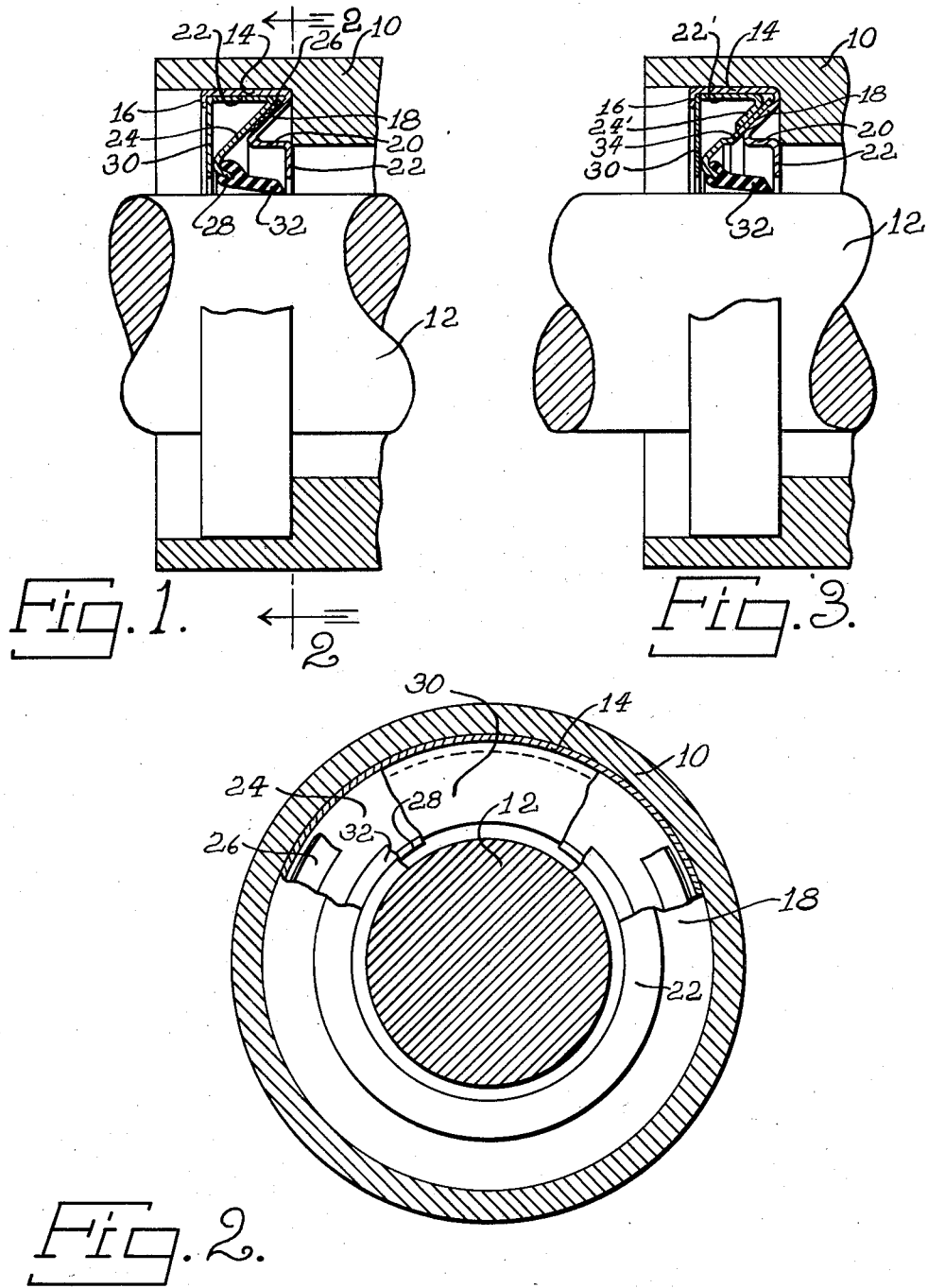

2,203,163

UNITED STATES PATENT OFFICE 2,203,163

SEAL

Simpson C. Leonard, Jr., Detroit, Mich.

Application June 2, 1938, Serial No. 211,346

2 Claims. (Cl. 288—3)

The invention relates to a seal and more particularly to an oil seal adapted to be inserted within the bore of a housing in encompassing relation to a rotatable shaft.

An object of the invention is the provision of a seal which may be economically produced and characterized by the novel arrangement of the component parts for facilitating assembly thereof. In carrying out the foregoing, the design and arrangement of component parts accommodate a sealing or packing member having a relatively small radial dimension but which presents a substantial surface for contact with the shaft to be sealed.

A seal of the foregoing type is capable of adjusting itself within predetermined limits to applications wherein the axis of the associated shaft may be slightly eccentric with respect to the bore of the housing.

Various other objects and advantages of the invention will be more apparent from the following description taken in connection with the accompanying drawing, in which:

Fig. 1 is a longitudinal sectional view through a housing showing the improved seal inserted therein in encompassing relation to a shaft.

Fig. 2 is a sectional view taken as indicated by the line 2—2 of Fig. 1.

Fig. 3 is a view similar to Fig. 1 but illustrating a modified form of the seal.

Referring to the form of the invention shown in Figs. 1 and 2, the seal is illustrated as disposed within a housing 10 in encompassing relation with a shaft 12. The seal includes an annular housing having an axially extending flange 14, one end of which terminates in a relatively short radially inwardly extending retaining flange or end wall 16, while the opposite end is provided with a second flange or end wall 18 extending generally diagonally inwardly. The flange or end wall 18 has an integral axially extending portion 20 which in turn has the integral radially extending flange 22. The portions 14, 18 and 20 cooperate to form a substantially Z-shaped structure in cross section.

Disposed within the housing is a flanged ring member, preferably metallic, substantially Z-shaped in cross section and including an outer axially extending flange 22, abutting the adjacent face of the housing portion 14, and a diagonally inwardly extending integral flange 24 substantially parallel with the flange or wall 18 and being spaced therefrom by a sealing washer 26. The flange 24 terminates in a substantially axially extending portion 28. The Z-shaped portion of the ring is inserted in the correspondingly shaped portion of the seal housing and retained therein by a washer 30 disposed axially between the end face of the housing portion 14 and the flange or end wall 16.

An annular sealing element 32, preferably a synthetic rubber composition, has one end portion thereof secured to the portion 28 of the flanged ring member. The sealing element has a relatively small radial dimension but provides a generally axially extending surface of substantial area for contact with the shaft 12.

The form of the invention shown in Fig. 3 is generally similar to that shown in Figs. 1 and 2 and like parts have been designated with like numerals. In the modified form, the ring member is substantially V-shaped in cross section, having only the flanges 22' and 24', the latter being relatively short. An annular seal carrying member 34 has a portion thereof disposed between the flange or end wall 18 of the housing and the flange 24' of the V-shaped ring, and the sealing element 32 is secured to the member 34 in the manner set forth in connection with the showing in Figs. 1 and 2.

Various changes including the size, shape and arrangement of parts may be made without departing from the spirit of the invention and it is not my intention to limit the scope thereof other than by the terms of the appended claims.

What I claim is:

1. An oil seal comprising an annular housing having an axially extending wall and spaced inwardly extending side walls, one of said side walls including angularly disposed portions cooperating with said axially extending wall to form a substantially Z-shaped structure in cross section, a flanged metallic ring member substantially Z-shaped in cross section having flanged portions arranged in substantially parallel relationship with respect to said angularly disposed portions respectively and having its outer axially extending flange positioned adjacent the inner periphery of said housing and between said side walls, a washer between one of said flanged portions and one of said angularly disposed portions, an annular packing member carried by the inner periphery of the other of said flanged portions of said flanged ring member, and a sealing washer between one of said side walls and said metallic ring member.

2. An oil seal comprising an annular housing having an outer axially extending portion and spaced side wall portions extending inwardly, at least one of said side walls and said axially extending portion cooperating to form a substantially V-shaped structure in cross section, an annular packing member for engagement with the outer periphery of a centrally located shaft, the outer periphery of said packing member being radially spaced from the inner periphery of said housing, and a metallic ring member including an axially extending portion and an integral portion extending diagonally therefrom toward the axis of said seal and in substantially parallel relationship with said portion of said side wall, said ring portions cooperating to form a substantially V-shaped structure in cross section disposed in nested relationship with respect to said housing V-shaped structure, and a carrying member for said packing disposed between said V-shaped structures.

SIMPSON C. LEONARD, Jr.